C. L. BAILEY.
VALVE.
APPLICATION FILED NOV. 18, 1911.
1,044,623.
Patented Nov. 19, 1912.
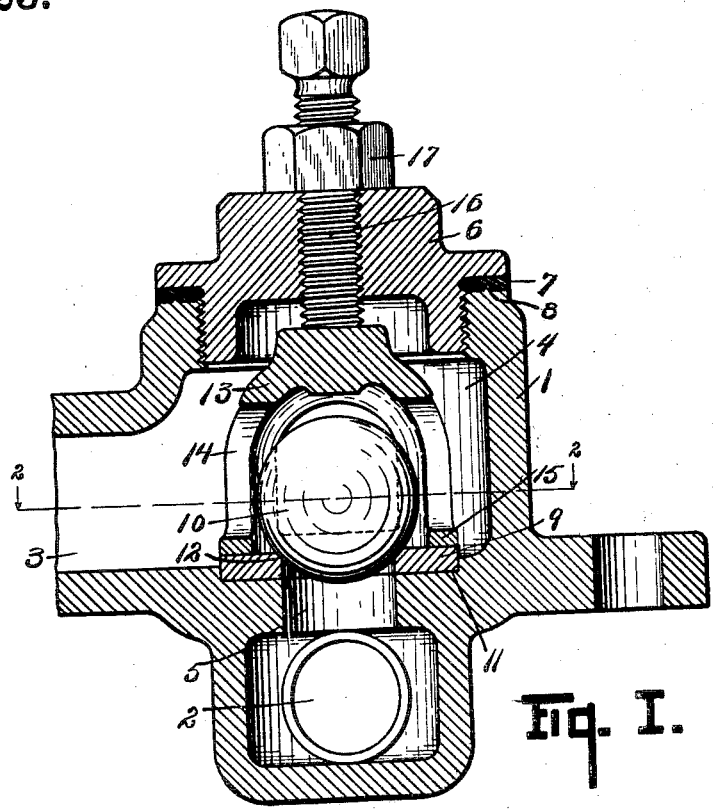
Fig. I.
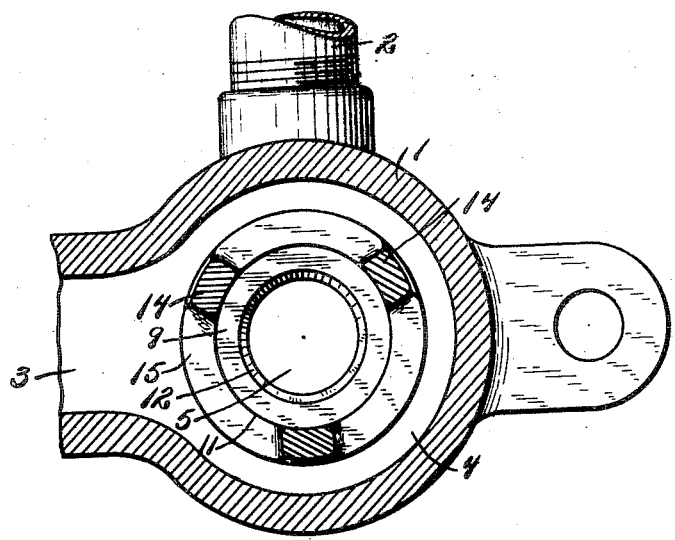
Fig. II.
Witnesses
Luella Grunfield
Margaret Glasgow
Inventor
Curtis L. Bailey
By Chappell Heard
Attorneys

UNITED STATES PATENT OFFICE.

CURTIS L. BAILEY, OF LANSING, MICHIGAN, ASSIGNOR TO THE "NEW-WAY" MOTOR COMPANY, OF LANSING, MICHIGAN.

VALVE.

1,044,623.  Specification of Letters Patent.  Patented Nov. 19, 1912.

Application filed November 18, 1911.  Serial No. 661,129.

*To all whom it may concern:*

Be it known that I, CURTIS L. BAILEY, a citizen of the United States, residing at the city of Lansing, county of Ingham, State of Michigan, have invented certain new and useful Improvements in Valves, of which the following is a specification.

This invention relates to improvements in valves.

The main objects of this invention are to provide an improved valve adapted for high pressure service in which the parts liable to wear or to such deteriorations as will be likely to render the valve ineffective, can be readily renewed.

A further object is to provide a valve having these advantages in which the renewal of parts can be readily accomplished by persons other than skilled mechanics and without the aid of special tools.

Further objects, and objects relating to structural details will definitely appear from the detailed description to follow.

I accomplish the objects of my invention by the devices and means described in the following specification.

The invention is clearly defined and pointed out in the claims.

A structure which is a preferred embodiment of my invention is clearly illustrated in the accompanying drawing, forming a part of this specification, in which:

Figure I is a vertical section through a structure embodying the features of my invention, the valve 10 being shown in full lines, as is also the clamping screw 16 and the lock nut 17. Fig. II is a detail section taken on a line corresponding to line 2—2 of Fig. I, looking in the direction of the arrows but not of the section lines, the valve 10 being omitted.

In the drawing, similar reference characters refer to similar parts in both views.

Referring to the drawing, the valve casing 1 is provided with a suitable inlet passage 2 and outlet passage 3, and with a valve chamber 4. The inlet communicates with the chamber 4 through the port 5. The casing 1 is provided with an opening which is closed when the parts are assembled by the cap or closure 6, the closure being threaded into the casing, as illustrated.

The closure is provided with a gasket 7 of lead, or other suitable material, an annular A-shaped rib 8 being provided to insure the sealing of this joint. The valve seat 9 for the valve 10 is arranged in a countersunk seat 11 provided therefor opposite the casing opening. The valve seat 9 is annular, it being shaped like a washer, and beveled off at 12 to receive the valve. The valve seat is retained in place and clamped to form a tight joint by means of a spider-like clamping member 13, having downwardly-diverging arms 14 connected at their lower ends by a ring 15 which rests upon the outer edge of the valve seat 11. The screw 10 is threaded through the closure 6 to engage and clamp the clamping member 13 in place. A lock nut 17 is provided for the screw 16.

With the parts thus formed and arranged, the opening of the casing is effectively closed and the removable valve seat clamped in position.

My improved valve is especially designed for high pressure service; for instance, in such uses as spraying machines where high pressures are required, and also the materials are likely to wear away the valve seat, or to deteriorate the same. The valve seat is in the form of a washer, as stated, and can be assembled or disassembled by an unskilled person and without the aid of special tools,—that is, a wrench is all that is required.

Having thus described my invention, what I claim as new and desire to secure by Letters Patent is:

1. The combination of a valve casing provided with an opening and having a threaded closure for said opening, a spherical valve, an annular washer-like valve seat, said casing being provided with a countersunk seat for said valve seat alined with said casing opening, a clamping member for said valve seat inclosed within said casing and adapted to receive and retain said valve and comprising downwardly diverging arms, the lower ends of the arms being connected by a ring resting on said valve seat, said clamping member, valve seat, and valve being removable through said casing opening, and a clamping screw threaded through said casing closure and engaging said clamping member.

2. The combination of a valve casing comprising a valve chamber having a countersunk seat at one side and an opposed opening, a threaded closure for said opening, a ball valve, an annular washer-like valve seat arranged on said casing seat, a spider-like clamping member for said valve seat inclosed within said casing and adapted to receive and retain said valve, said clamping member, valve seat, and valve being removable through said casing opening, and a clamping screw threaded through said casing closure and engaging said clamping member.

In witness whereof, I have hereunto set my hand and seal in the presence of two witnesses.

CURTIS L. BAILEY. [L. S.]

Witnesses:
E. W. GOODNOW,
J. P. EDDIE.